Figure 1:
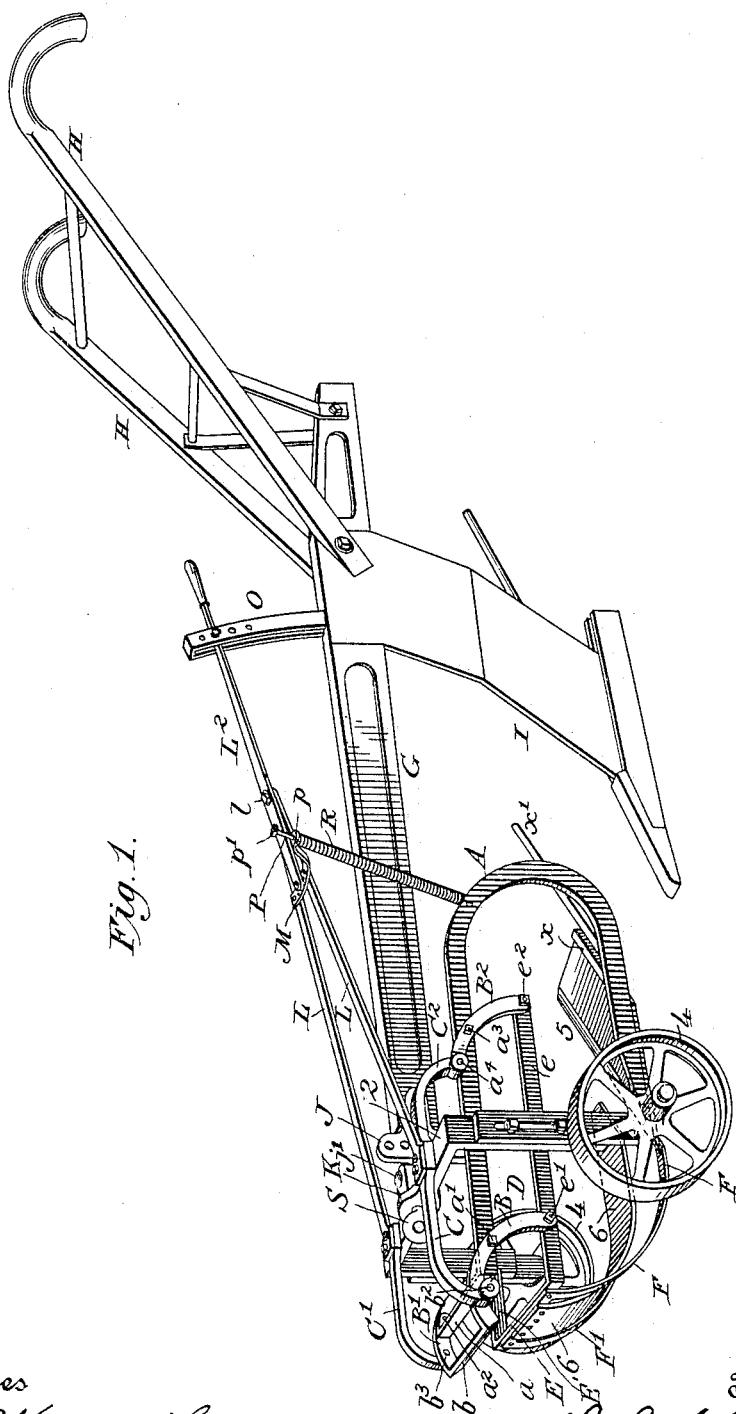

No. 766,127. PATENTED JULY 26, 1904.
L. L. WILSON.
MACHINE FOR TOPPING BEETS.
APPLICATION FILED JAN. 11, 1904.
NO MODEL. 3 SHEETS—SHEET 3.

Witnesses
Sidney P. Hollingsworth
A. M. E. Kennedy

Inventor
L. L. Wilson
by P. T. Dodge
Attorney

No. 766,127. Patented July 26, 1904.

UNITED STATES PATENT OFFICE.

LEVI L. WILSON, OF VASSAR, MICHIGAN.

MACHINE FOR TOPPING BEETS.

SPECIFICATION forming part of Letters Patent No. 766,127, dated July 26, 1904.

Original application filed November 17, 1902, Serial No. 131,755. Divided and this application filed January 11, 1904. Serial No. 188,520. (No model.)

*To all whom it may concern:*

Be it known that I, LEVI L. WILSON, of Vassar, county of Tuscola, and State of Michigan, have invented a new and useful Improvement in Machines for Topping Beets, of which the following is a specification, being a division of original application filed November 17, 1902, Serial No. 131,755.

My invention has reference to machines for "topping" growing beets, which is accomplished by cutting from the top of the beet a slice bearing the leaves, leaving the root in a condition to be conveniently removed from the ground. Machines for this purpose commonly embody a frame adapted to be advanced through the field, on which frame is arranged a cutter or knife which as the machine advances is presented to the beet and acts to sever the top from the same.

I have observed in growing beets certain peculiarities which demand for economical and effective topping variations, both in the distance from the ground and in the distance from the top of the beet, that the cutter should act on different beets. For instance, low-growing beets spread their leaves at about the surface of the ground and are characterized by a low smooth top, while high-growing beets stand partly out of the ground, with their leaves growing farther down on the root than the others, but not as near to the surface of the soil, and these are characterized by a thick rough top. If all the beets are cut at the same distance from the ground, either too large a slice will be taken from the high beet or the slice cut from the low beet will be insufficient, while if all the beets are cut the same distance from their tops the slices taken from the high beet will not be of sufficent thickness to reach the base of the leaves. It is desirable, therefore, that the low-growing beet be cut at but a slight distance down from its top and at but a slight height above the ground and the high-growing beet be cut a greater distance down from its top and a greater distance from the ground in order in each case to reach the base of the leaves. To meet these peculiar conditions, I have devised a gage device which is controlled by the height of the growing beets and the leaves thereon and which coöperates with the knife or cutter in such manner that the high-growing beet will be severed at a greater distance downward from their tops and at a higher point from the ground than the low-growing beet, so that in each case the beet is severed at the base of the leaves, notwithstanding the fact that this point differs both as to distance from the ground and distance from the tops in the two kinds of beets. In effecting this action of the parts the gage and knife are so connected that while the rise of the gage will also lift the knife the movement of the latter will be less in proportion, resulting in a differential action of the parts, so that the vertical distance between the gage and the knife will increase as the gage rises. A high beet will under these conditions lift the gage a considerable distance; but the knife will rise but a slight distance and the beet will be cut at a considerable distance from its top and at a distance from the ground in differential proportion to the rise of the gage, whereas with a low-growing beet the gage rising but slightly the knife will cut closer to the ground and closer to the top of the beet. In other words, the height of the beet controls the size of the slice cut from it.

Figure 2:
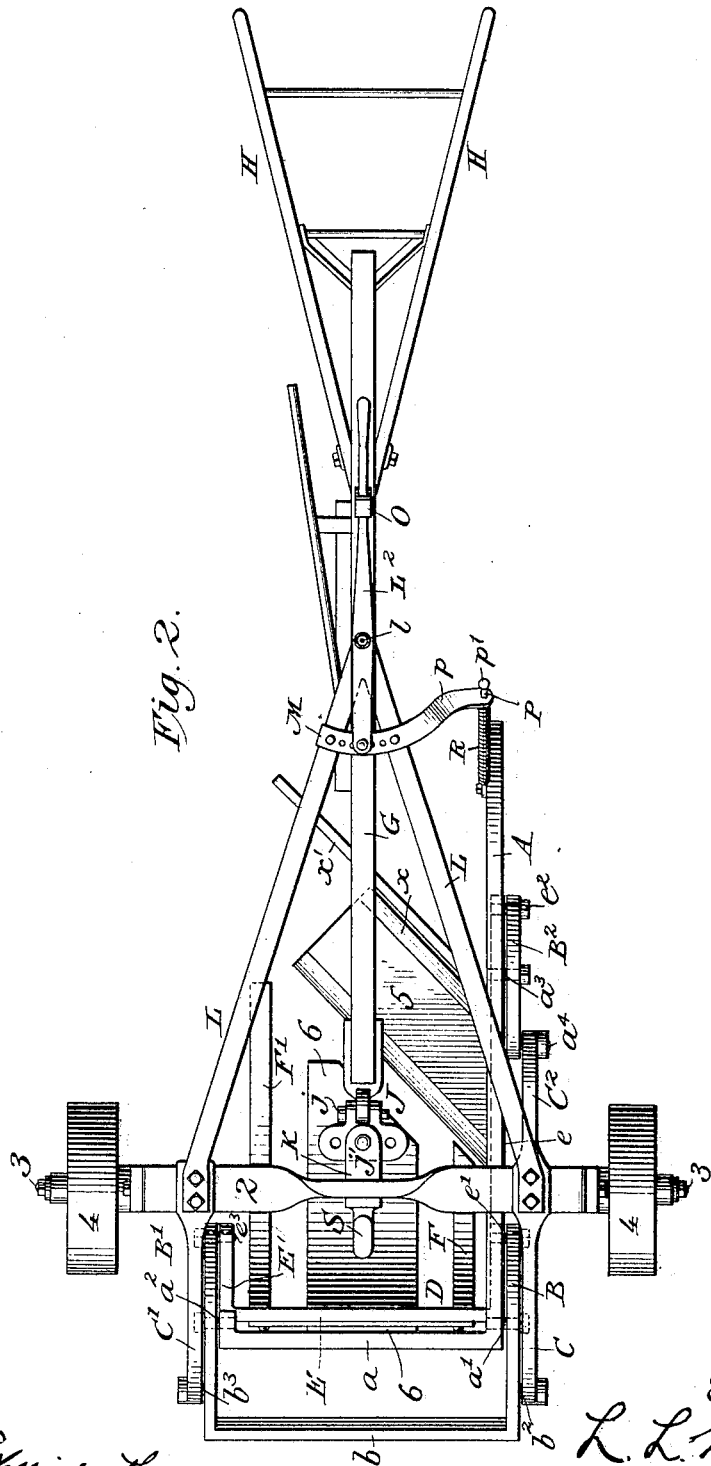
Figure 3:
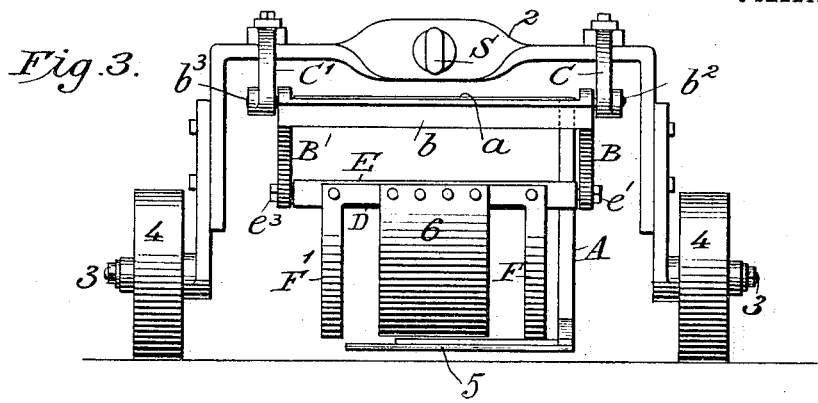
Figure 4:
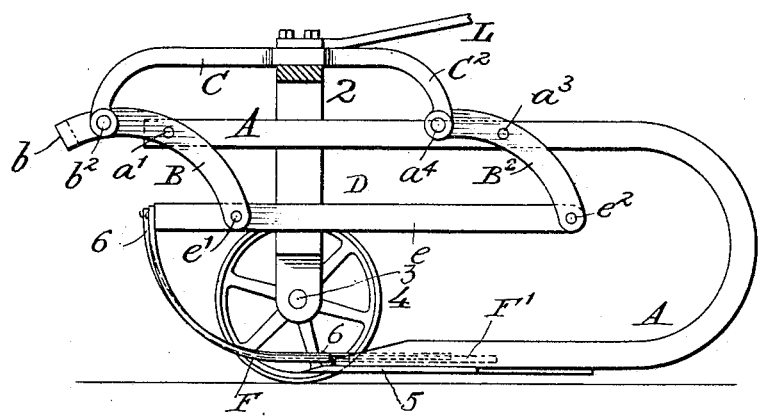
Figure 5:
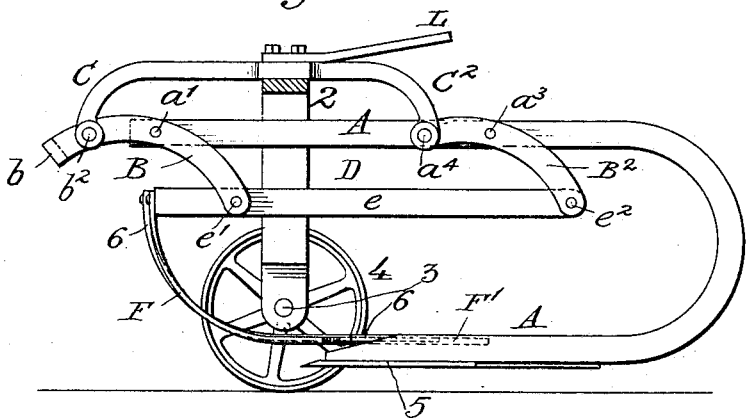

Referring to the drawings, Figure 1 is a perspective view of my improved machine. Fig. 2 is a top plan view of the same. Fig. 3 is a front elevation of the machine. Fig. 4 is a side elevation with one of the carrying-wheels removed and showing the gage and knife in the positions they assume when acting on a low-growing beet. Fig. 5 is a similar view showing the parts in the positions they assume when the knife acts on the high-growing beet.

In the accompanying drawings I have represented my improved topping mechanism connected with a "beet-lifting" device so as to travel in advance of the same, to receive support therefrom, and to be controlled in its path of movement thereby; but it will be understood that this device constitutes no part of the present invention, and it may be replaced by other supporting means or wholly dispensed with without departing from the limits of my invention.

My improved topping mechanism is mounted on and sustained by a wheeled frame consisting of a horizontal transverse frame-bar 2, to which are connected horizontal longitudinally-extending bracket-arms C, C', and C², the said frame-bar having its ends turned downwardly and having adjustably secured to them stub-axles 3, on which are mounted carrying-wheels 4.

The topping mechanism comprises as its main and essential features a flat knife 5, arranged in a horizontal position between the wheels with its cutting edge at an inclination, so as to act with a shear, and a gage device 6, arranged in front of the knife and consisting of a downwardly and rearwardly curved plate adapted as the wheeled frame advances to ride upon the tops of the beets and be raised and lowered thereby and a connecting mechanism between the knife and the gage formed to cause the knife to move up and down with the gage, but at less speed, so that the distance between the gage and knife will increase as the gage rises, thereby producing a differential action or movement of the knife.

The connection between the knife and the gage device whereby the differential action of the former is secured may be of any appropriate character; but I prefer to adopt the construction shown in the drawings, where it will be seen that the knife is mounted on a knife-frame consisting of a bar A, extending laterally at its front end, as at $a$, whence it extends longitudinally rearward between the wheels and is then curved downward and extends forward, terminating beneath the upper portion, the knife, in the form of a flat plate strengthened at one edge by a strip $x$, being mounted rigidly on this forward extension of the knife-frame. The front laterally-extending portion $a$ of this knife-frame is pivoted at its ends on horizontal transverse axes $a'$ $a^2$ about midway between the ends of two parallel curved arms B B', having their upper forward ends connected rigidly together by a cross-bar $b$ and constituting a guiding-frame which is pivoted at its front to swing up and down on a horizontal transverse axis formed by pivots $b^2$ $b^3$ to the front ends of the horizontal longitudinal bracket-arms C C', extending forward from the frame-bar 2. The knife-frame has its longitudinal portion A jointed on a horizontal axis $a^3$ to a curved arm B² at a point between the ends of the same, which arm is jointed at its upper forward end on an axis $a^4$ to the rear end of the bracket-arm C², extending rearwardly from the frame-bar.

As a result of the construction described when the curved arms B B' B² are raised and lowered on their axes through the action of the gage device, as will be presently explained, the knife-frame will be correspondingly moved up and down, preserving at all times a truly horizontal position notwithstanding its vertical movements.

The downwardly-curved gage-plate 6, before alluded to, is fixed rigidly to a gage-frame D, consisting of a transversely-extending horizontal bar E, to which the upper forward end of the plate is rigidly fastened, which bar has at one side a rearwardly-extending longitudinal portion $e$, jointed, as at $e'$, to the lower end of the curved arm B of the guiding-frame and jointed also at $e^2$ to the lower end of the curved arm B². At its opposite end the bar E has connected with it a short rearwardly-extending bar E', jointed on axis $e^3$ to the lower end of the curved arm B' of the guiding-frame.

As a result of the connections described between the gage-plate and the knife the vertical movement of the gage-plate will lift the guiding-frame and the curved arm B² on their axes, and by reason of their connection with the knife-frame the latter will also be lifted bodily; but this frame being connected nearer the axes of movement of the curved arms than the connection of the gage-frame therewith the knife-frame will move at less speed, so that the vertical distance between the gage and knife will increase as the gage rises.

In the operation of the machine the carrying-wheels straddle the row of plants, and as the machine advances the curved gage-plate resting on the leaves of the beets is raised and lowered according to the height of the beets, being prevented from leaving the row by two guide-rods F F', extending along the edges of the plate in a position to trail at the sides of the row and connected at their upper ends rigidly with the cross-bar E of the gage-frame. When a high-growing beet is encountered, the gage will rise correspondingly and ride over its top; but the knife owing to the peculiar connection described will not rise to the same extent, and it will be presented against the beet a considerable distance downward from the top of the same and at a point some distance above the ground and will thus reach the base of the low-growing leaves and sever the large rough top from the beet. When a low-growing beet is encountered, the gage will rise but slightly and the knife will act closer to the ground and at less distance from the top of the beet and will sever a thin slice. It is seen, therefore, that while a high-growing beet will raise the gage a considerable distance the knife will not be raised in proportion, but remains, so to speak, near the ground, the result being that a large slice will be severed from the high beet, but at a higher point from the ground than the small slice which will be cut from the lower beet, and by reason of the fact that the size of the slice to be cut from the different beets increases in fair proportion to the height of the same my gage acts automatically to control the size of the slices, the result being that there will be no waste, but each beet will be cut, notwithstanding its height, close to the base of the leaves.

By reason of the connection of the gage-frame to the lower end of arms which are mounted at their upper ends on horizontal axes the gage-frame in rising will also move rearwardly, so that sudden contact with the beet is prevented, thereby avoiding any risk of breaking or injuring the plant.

As the tops are severed they are deflected to the side by means of a deflecting-rod $x'$, extending rearwardly from the knife-frame in rear of the knife and at an inclination with respect to the line of travel.

In the practical use of my machine some means for maintaining the wheel-frame in a horizontal position and for guiding it in its movements through the field are desired. I prefer to adopt for this purpose a lifting or digging device such as is represented in the drawings, the purpose being that this digging device will follow behind the topping mechanism and will raise the beets after they are acted on by the topper.

The digging device is in the form of a plow having a fore-and-aft beam G, with guiding-handles H at its rear end and a standard or colter I, provided with a shoe and suitably formed to act at the side of the beet and raise the same from the ground. At its forward end the beam is provided with a clevis J, jointed to it on a horizontal axis $j$ and jointed in turn on a vertical axis $j''$ to a swivel-block K, connected with the frame-bar 2 on a horizontal axis, these parts permitting both horizontal and vertical pivotal motions of the wheel-frame with reference to the beam.

Extending rearwardly from the ends of the frame-bar 2 and above the beam G are two converging bars L, connected rigidly together at their rear ends, and to these bars at their point of connection is pivoted between its ends on a vertical axis $l$ an adjusting-lever $L^2$, the forward end of which is adapted to be connected at different points on a bracket-plate M, spanning the bars L L, while the opposite end of the adjusting-lever is extended through a vertical guideway in a standard O, extending upward from the beam, in which guideway the lever is adapted to be fastened at different points. By adjusting the lever $L^2$ up and down in this guideway the wheel-frame may be tipped or adjusted vertically with reference to the beam, so as to regulate the position of the knife with reference to the surface of the ground, and by adjusting the forward end of the lever $L^2$ along the bracket-plate M the lateral draft of the frame and its movement on a vertical axis may be controlled.

When the parts are in the position shown, the connection of the wheel-frame with the beam through the medium of the converging bars L and the connecting adjusting-lever will permit the wheel-frame to be guided from the handles H of the plow-beam, it being but necessary to swing the handles to the right or left to cause the wheel-frame to pursue an opposite path.

In order that the knife-frame and the connected parts may be held yieldingly to their work, I propose to joint to the longitudinally-extending portion of the knife-frame where it curves upward and forward from the knife the lower end of a rod P, whose upper end is passed loosely through an extension $p$ on the bracket-plate M and is provided with a head $p'$ above said plate. This rod is encircled by a spiral spring R, bearing at its upper end against the extension $p$ and at its lower end against the knife-frame and acting to depress the latter yieldingly. The draft-animals may be connected with the wheeled frame by a ring or equivalent device S, connected with the frame-bar 2 at its center.

Having thus described my invention, what I claim is—

1. In a beet-topping mechanism adapted to act on high and low growing beets, the combination with a cutting mechanism movable vertically, of means controlled by the height of the beet for automatically adjusting the cutting mechanism to cut high-growing beets farther down from the top and higher from the ground than the low-growing beets.

2. In a beet-topping mechanism, the combination with a cutter adapted to be presented to the beet and movable vertically, of means controlled by the height of the beet for varying the distance from the top of the beet the cutter will act.

3. In a beet-topping mechanism the combination with a vertically-movable cutter, of a gage device adapted to control the movements of the cutter and a differential connection between the two.

4. In a beet-topping mechanism, the combination with a sustaining-frame, of a vertically-movable cutter mounted thereon, a gage sustained by said frame and movable up and down, and operative connections between the gage and the cutter for increasing the vertical distance between the two as the gage rises.

5. In a beet-topping mechanism, the combination with a sustaining-frame adapted to be advanced through the field, of a guiding-frame mounted on the sustaining-frame on a horizontal transverse axis, a gage-frame pivoted to said guiding-frame on a horizontal transverse axis, a gage device carried by the gage-frame and adapted to ride on the tops of the growing beets, a knife-frame pivoted to the guiding-frame on a horizontal axis between the axis of the guiding-frame and the axis of the gage-frame, and a knife carried by said knife-frame in rear of the gage.

6. In a beet-topping mechanism, the combination with a sustaining-frame, of a vertically-movable pivotal guiding-frame sustained thereby, a gage-frame mounted on said guiding-frame, a gage thereon, a knife-frame mounted on the guiding-frame between the axis of the gage-frame and the axis of the guiding-frame, and a knife carried by the knife-frame.

7. In a beet-topping mechanism the combination with a knife movable vertically, of a gage movable relatively to the knife upwardly and rearwardly and connections between the gage and knife for controlling their relative movements.

8. In a beet-topping mechanism the combination with a sustaining-frame, of a guiding-frame pivoted near its forward upper end to the sustaining-frame on a horizontal transverse axis and comprising two parallel arms extending rearwardly and downwardly and connected together at their upper ends, a downwardly and rearwardly extending arm $B^2$ pivotally mounted on the sustaining-frame in rear of the guiding-frame on a horizontal transverse axis, a gage-frame jointed at its front to the lower ends of the arms of the guiding-frame, and jointed also to the lower end of the pivoted arm $B^2$, a gage-plate fixed at its upper end rigidly to the front of the gage-frame, a knife-frame pivoted at its front to the arms of the guiding-frame between their ends and pivoted also to the arm $B^2$ between its ends, and a knife connected with the knife-frame in rear of the gage-plate.

9. In a beet-topping mechanism the combination with a sustaining-frame, of a vertically-movable knife-frame comprising a longitudinally-extending upper portion having its rear extremity extending downwardly and then forwardly beneath the longitudinal portion, a knife connected with the forward extension of the frame, and connections between the longitudinal upper portion of the knife-frame and the sustaining-frame for guiding the former in its vertical movements.

10. In a topping mechanism the combination with a sustaining-frame, of a horizontally-arranged rising and falling gage-frame, a knife-frame arranged horizontally above said gage-frame and connected with it and formed at its rear end with a downward and forward extension projecting below the gage-frame, and a knife connected with said forward extension of the knife-frame.

In testimony whereof I hereunto set my hand, this 31st day of July, 1903, in the presence of two attesting witnesses.

LEVI L. WILSON.

Witnesses:
P. L. VARNUM,
W. A. LIVINGSTON.